(No Model.) 2 Sheets—Sheet 1.
B. M. GLASGOW.
SPRING GEAR FOR VEHICLES.
No. 551,312. Patented Dec. 10, 1895.
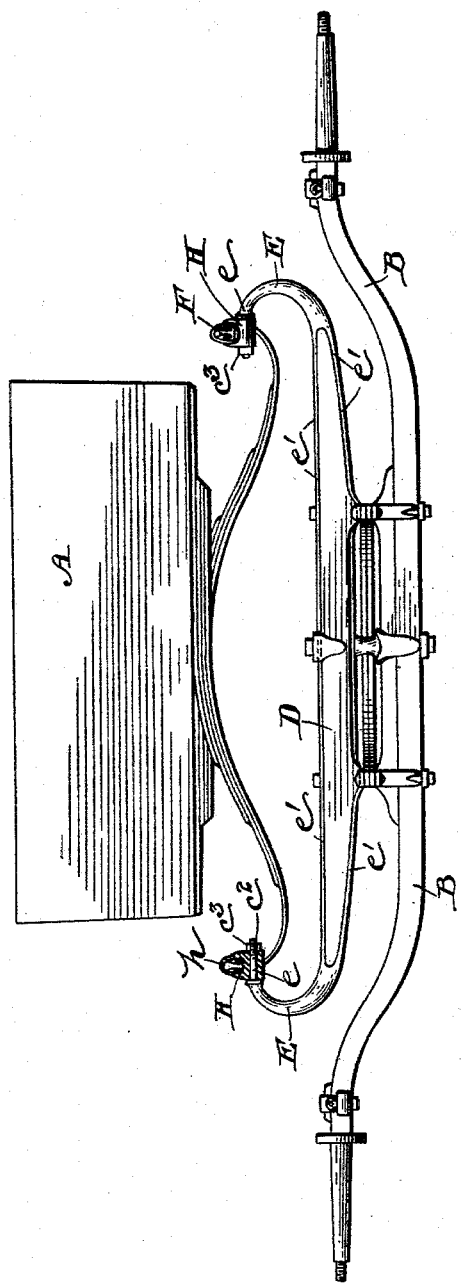
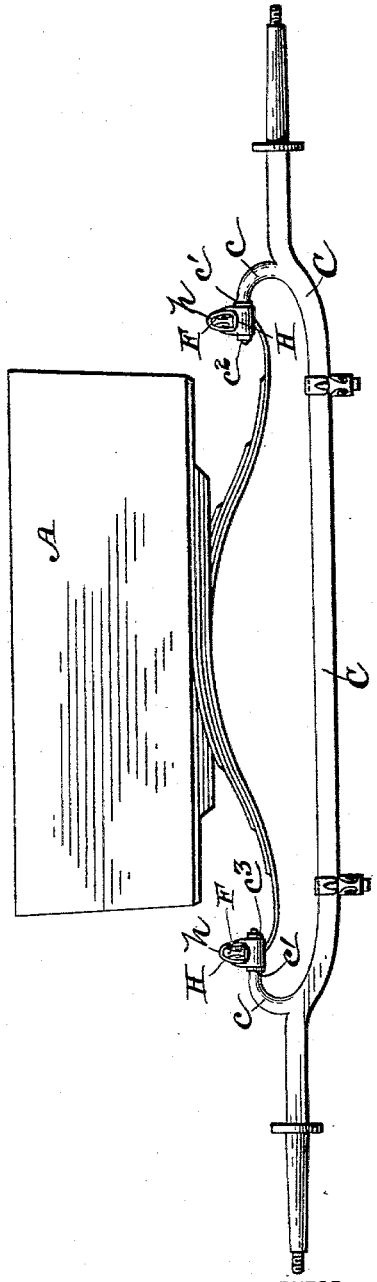
WITNESSES
INVENTOR (No Model.) 2 Sheets—Sheet 2.
B. M. GLASGOW.
SPRING GEAR FOR VEHICLES.
No. 551,312. Patented Dec. 10, 1895.
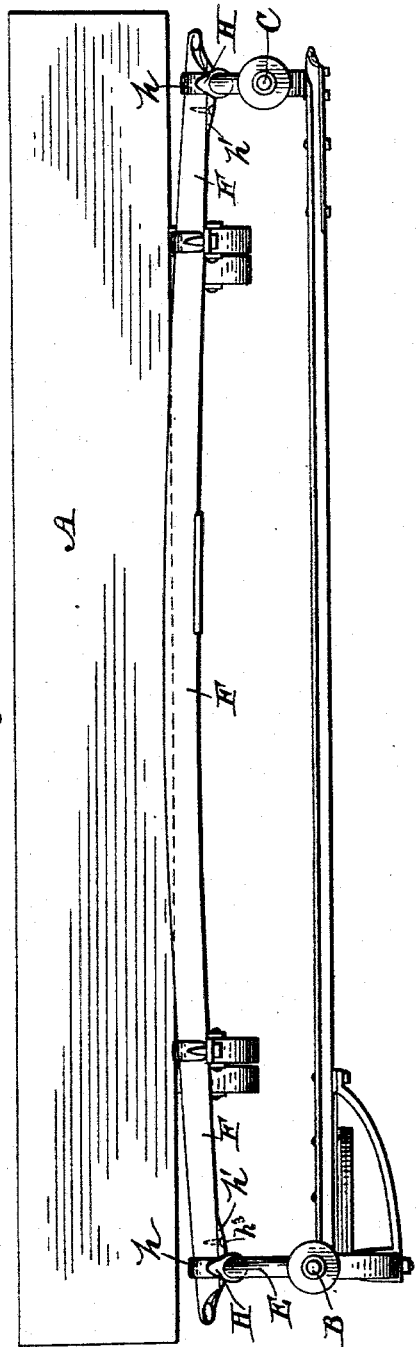
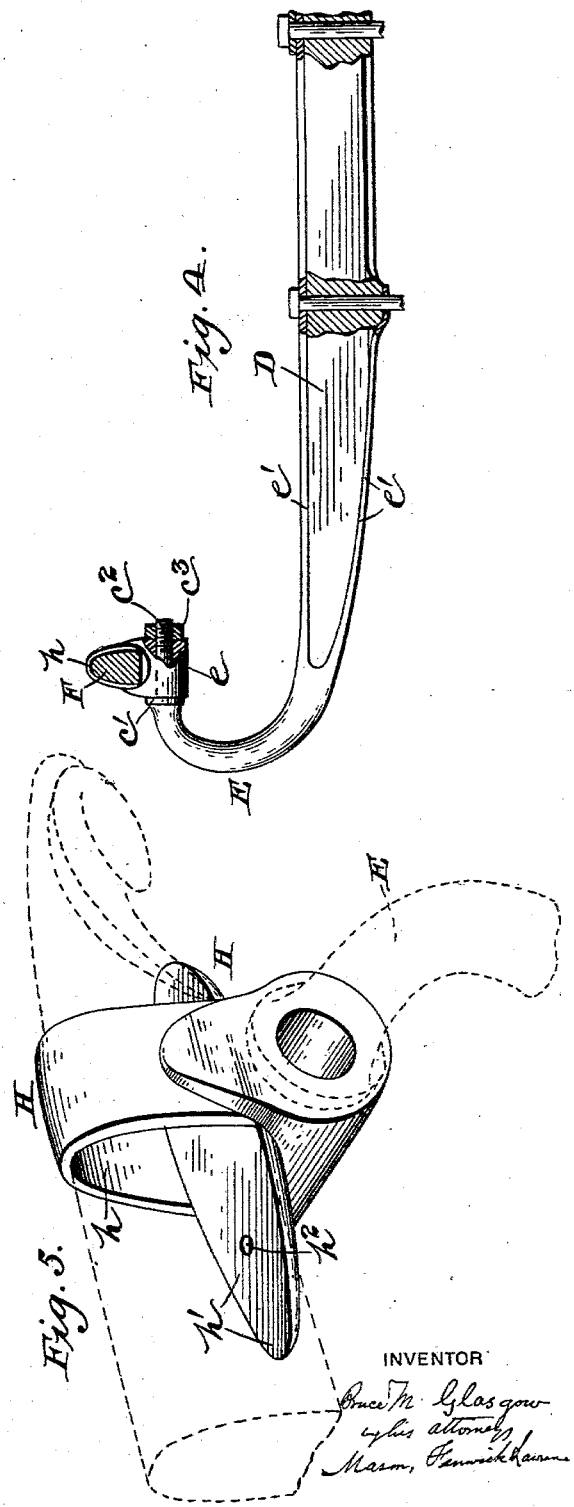
WITNESSES
Severance
W Harvey Muzzy
INVENTOR
Bruce M. Glasgow
by his attorneys
Mason, Fenwick & Lawrence

UNITED STATES PATENT OFFICE.

BRUCE M. GLASGOW, OF NEW YORK, N. Y.

SPRING-GEAR FOR VEHICLES.

SPECIFICATION forming part of Letters Patent No. 551,312, dated December 10, 1895.

Application filed October 2, 1895. Serial No. 564,463. (No model.)

*To all whom it may concern:*

Be it known that I, BRUCE M. GLASGOW, a citizen of the United States, residing at New York, in the county of New York and State of New York, have invented certain new and useful Improvements in Running-Gear for Vehicles; and I do hereby declare the following to be a full, clear, and exact description of the invention, such as will enable others skilled in the art to which it appertains to make and use the same.

My invention relates to improvements in running-gear for vehicles and is an improvement on Letters Patent No. 395,191, granted December 28, 1888.

The invention consists of improved devices for supporting the side bars and connecting them to the bolster; also an improved axle formed with side-bar-supporting projections.

It also consists of certain other novel constructions, combinations and arrangements of parts, all of which will be hereinafter more particularly set forth and claimed.

In the accompanying drawings, forming part of this specification, Figure 1 represents a front elevation of a wagon running-gear with my invention applied thereto. Fig. 2 represents a rear elevation of the same. Fig. 3 represents a side elevation of the same. Fig. 4 represents a detail side elevation, partly in section, of one end of the front bolster and supporting device for the side bars; and Fig. 5 represents a detail perspective view of my improved side-bar clip.

A in the drawings represents the wagon-body; B, the front axle; C, the rear axle; D, the bolster; E, the side-bar-supporting devices attached to said bolster, and F the side bars.

With the exception of the rear axle and the supporting devices for the forward ends of the side bars, the gear is the same in this as in the aforesaid Letters Patent. The said rear axle C is provided with two upwardly and inwardly projecting integral supporting-arms $c$ $c$. The ends of these arms are reduced, forming shoulders $c'$, and the outer ends of said reduced portions are screw-threaded at $c^2$. Clips H are provided on said reduced portions; the latter passing through passages in said clips, which are secured in position by nuts $c^3$ on said screw-threaded ends. The said clips rest firmly against their respective shoulders $c'$ when secured in position on said arms $c$. The said clips H are each provided with a loop $h$ through which the tapering end of the side bar is passed and wedged. Each clip is also provided with a securing-plate $h'$, upon which the bottom of the side bar rests, said plate having a screw-passage $h^2$, through which a screw $h^3$ is passed into the side bar, thus securing said clip firmly in position on said bar. The bolster D is of ordinary construction, and has applied thereto the supports E. These are preferably cast or constructed all in one piece, as shown in Fig. 1, with two upwardly and inwardly curved ends forming side-bar supports $e$, similar in formation to supports $c$, and attached in the same manner to the side bars by clips H, screw-threads $c^2$, and nuts $c^3$, plate $h'$, and screw $h^3$.

The supports E are bifurcated at their inner ends to form tangs $e$ $e$ and $e'$ $e'$. The upper tangs $e$ in the construction shown in Fig. 1 lie upon the upper side of the bolster and form one continuous strip across the same. The lower tangs $e'$ extend only a short distance along each end of the under side of the bolster and are each provided with an angular bend at the inner free end, said bends fitting over suitable projections on the bolster and thus bracing said tangs. The tangs are secured to the bolster by suitable bolts.

As shown in Fig. 4, I have divided the upper tangs $e'$ in the middle and overlapped the two ends and secured them by a bolt. The springs, mountings, and connections not specially described in this specification are preferably of the construction described in the aforesaid Letters Patent, but may be of any other suitable construction.

By my improved construction of clip-fastenings I avoid the objection to the clip-fastenings of ordinary construction, which clip-fastenings are liable to work loose and rattle, whereas when the clip is formed of one piece with a passage through it for the side bar, and a passage for the screw-threaded end of the support, a very solid connection can be effected by a fastening-screw passed through the base-plate $h'$, and a nut screwed on the end of the support. The same result is secured from my improved clip-fastenings whether applied to the axle and side bars or to the bolster and side bars.

Having now described my invention, what I claim as new, and desire to secure by Letters Patent, is—

1. In a running gear for vehicles, the combination of a rear axle having upwardly turned integral arms for supporting the side bars, a front axle, a bolster movably mounted on said latter axle, side bar supports mounted on said bolster and each provided with tangs secured to the top and bottom of the bolster, substantially as described.

2. In a running gear for vehicles, the combination of a rear axle provided with upwardly turned integral arms having screw threaded ends and side bar clips adapted to be secured on said screw threaded ends by securing nuts, substantially as described.

3. In a running gear for vehicles, the combination of a front axle, a bolster movably mounted on the same, and side bar supports provided with tangs adapted to be secured to the respective upper and lower sides of the bolster, substantially as described.

4. In a running gear for vehicles, the combination of a rear axle having upwardly turned integral arms for supporting the side bars, a front axle, a bolster movably mounted on said axle, side bar supports mounted on said bolster and each provided with tangs secured to the top and bottom of the bolster, and clips adapted to be secured on the ends of the side bar supports and comprising a loop for receiving the side bar, a base plate for the latter to rest upon and an apertured portion for receiving the end of the side bar support, substantially as described.

In testimony whereof I hereunto affix my signature in presence of two witnesses.

BRUCE M. GLASGOW.

Witnesses:
JOHN A. HEROLD,
WALTER D. COLEMAN.